(12) United States Patent
Weintraub et al.

(10) Patent No.: US 12,175,521 B2
(45) Date of Patent: Dec. 24, 2024

(54) AUTOMATIC SELECTION OF DYNAMIC DATA ENTRIES FOR MULTIPLE DYNAMIC DATABASES

(71) Applicant: Maplebear Inc., San Francisco, CA (US)

(72) Inventors: Danna Weintraub, New York, NY (US); Erik Wolfe, St. Louis, MO (US)

(73) Assignee: Maplebear Inc., San Francisco, CA (US)

( * ) Notice: Subject to any disclaimer, the term of this patent is extended or adjusted under 35 U.S.C. 154(b) by 269 days.

(21) Appl. No.: 17/752,061

(22) Filed: May 24, 2022

(65) Prior Publication Data

US 2023/0385911 A1 Nov. 30, 2023

(51) Int. Cl.
*G06Q 30/00* (2023.01)
*G06Q 30/0601* (2023.01)

(52) U.S. Cl.
CPC ..... *G06Q 30/0639* (2013.01); *G06Q 30/0633* (2013.01); *G06Q 30/0643* (2013.01)

(58) Field of Classification Search
CPC .................................................. G06Q 30/00
See application file for complete search history.

(56) References Cited

U.S. PATENT DOCUMENTS

| | | | | |
|---|---|---|---|---|
| 10,242,336 B1 * | 3/2019 | Agarwal | ............... | G06Q 10/083 |
| 2015/0012381 A1 * | 1/2015 | Lazaro | ............... | G06Q 30/0633 |
| | | | | 705/26.8 |
| 2016/0042315 A1 * | 2/2016 | Field-Darragh | ......... | H04B 5/77 |
| | | | | 705/28 |
| 2016/0335686 A1 | 11/2016 | AthuluruTlrumala et al. | | |
| 2018/0032997 A1 | 2/2018 | Gordon et al. | | |
| 2021/0142391 A1 | 5/2021 | Van Horne et al. | | |
| 2022/0114640 A1 | 4/2022 | Pawar | | |
| 2022/0129920 A1 * | 4/2022 | Starostenko | ....... | G06Q 30/0204 |
| 2022/0230450 A1 * | 7/2022 | Yin | ...................... | G06V 20/584 |

(Continued)

OTHER PUBLICATIONS

Wegoshop.com1, https://web.archive.org/web/20220122112257/ https://www.wegoshop.com (Year: 2022).*

(Continued)

*Primary Examiner* — Mark A Fadok
(74) *Attorney, Agent, or Firm* — Fenwick & West LLP

(57) ABSTRACT

An online system may receive, from a user device, a request to view, at a graphical user interface, available entries of a third-party system. The third-party system may operate multiple physical locations. The operation of each physical location is documented by a time-sensitive dataset which includes multiple dynamic item entries. The online system may retrieve a geographical location associated with the user device and determine a subset of physical locations operated by the third-party system that are eligible for further selection based on distances of the physical locations from the geographical location associated with the user device. The online system may determine a metric measuring a size of the dynamic item entries available in the time-sensitive dataset and select one of the physical locations based on the metric. The online system may cause for display the dynamic item entries in the time-sensitive dataset associated with the selected physical location.

20 Claims, 9 Drawing Sheets

(56) References Cited

U.S. PATENT DOCUMENTS

2023/0197204 A1* 6/2023 Montserrat ............ G06N 20/20
                                                                         702/20

OTHER PUBLICATIONS

Wegoshop.com2, https://web.archive.org/web/20211126235421/https://www.wegoshop.com/about-us.html[, dated Nov. 12, 2021 (Year: 2021).*
Wegoshop.com3, https://web.archive.org/web/20211126230637/https://www.wegoshop.com/ordering-tips.html, dated Nov. 26, 2021. (Year: 2021).*
Wegoshop.com4, https://web.archive.org/web/20211126225907/https://www.wegoshop.com/start-a-grocery-delivery-business.html, dated Nov. 26, 2021. (Year: 2021).*
Wang, Luyao, Site seelection of retail shops based on Spacial accessability and hybrid BP neural network, International journal or Geo-Information, dated May 29, 2018. (Year: 2018).*
PCT International Search Report and Written Opinion, PCT Application No. PCT/US2023/18880, Jul. 21, 2023, 7 pages.

* cited by examiner

AUTOMATIC SELECTION OF DYNAMIC DATA ENTRIES FOR MULTIPLE DYNAMIC DATABASES

FIELD

This disclosure relates generally to selecting a time-sensitive dataset for display and, more specifically, to selecting a time-sensitive dataset that has dynamic item entries that are best suited for display.

BACKGROUND

Delivering accurate, relevant and sometimes user-tailored data to users is often a challenging task for any online system, particularly ones with large databases. In some cases, a database may include various data entries that are fast changing. The various changes in the databases may affect how a user interacts with a system. In some cases, a system may be associated with different databases that may serve as available options for presentation. The manual selection by a user to review each dataset may often be a challenging task and unsatisfactory to the user because the user, before reviewing the data, usually does not know what data entries are available in the dataset. This could result in users switching back and forth between various datasets. This process often adversely affects the user experience of the system.

SUMMARY

In some embodiments, a process for selecting a time-sensitive dataset for display at a graphical user interface is disclosed. The process may automatically select a time-sensitive dataset that has the most dynamic data entries for a user to review so that the user can explore the most data entries available. In some embodiments, a system may include multiple time-sensitive datasets. Each of those datasets may document an operation of a physical location of the system. In a graphical user interface, a user may want to interact with the system but has insufficient information to determine which physical location will result in the best experience for the user. An online system may determine the physical location automatically, such as using one or more metrics and/or a machine learning model, to increase the data entries available to review for the user.

In some embodiments, the online system may select a time-sensitive dataset to increase the number of dynamic item entries available for user to review. In some embodiments, the user may be in a session in which the user requests a physical arrangement between an agent of the online system and the third-party system at a physical location of the third-party system. The third-party system operates a plurality of physical locations. The operation of each physical location is documented by a time-sensitive dataset which includes a plurality of dynamic item entries that vary in a course of the operation of the physical location. The online system may retrieve a geographical location associated with the user device. The online system may determine a subset of physical locations operated by the third-party system that are eligible for further selection based on distances of the physical locations from the geographical location associated with the user device. The online system may determine, for each physical location in the subset, a metric measuring a size of the dynamic item entries available in the time-sensitive dataset and select of the physical locations in the subset based on the metric. The dynamic item entries in the time-sensitive dataset associated with the selected physical location may be displayed at the graphical user interface. The display of the dynamic item entries allows the user device to select the available entries of the third-party system to be included in the physical arrangement.

The figures depict embodiments of the present disclosure for purposes of illustration only. Alternative embodiments of the structures and methods illustrated herein may be employed without departing from the principles, or benefits touted, of the disclosure described herein.

DETAILED DESCRIPTION

System Overview

Figure 1:
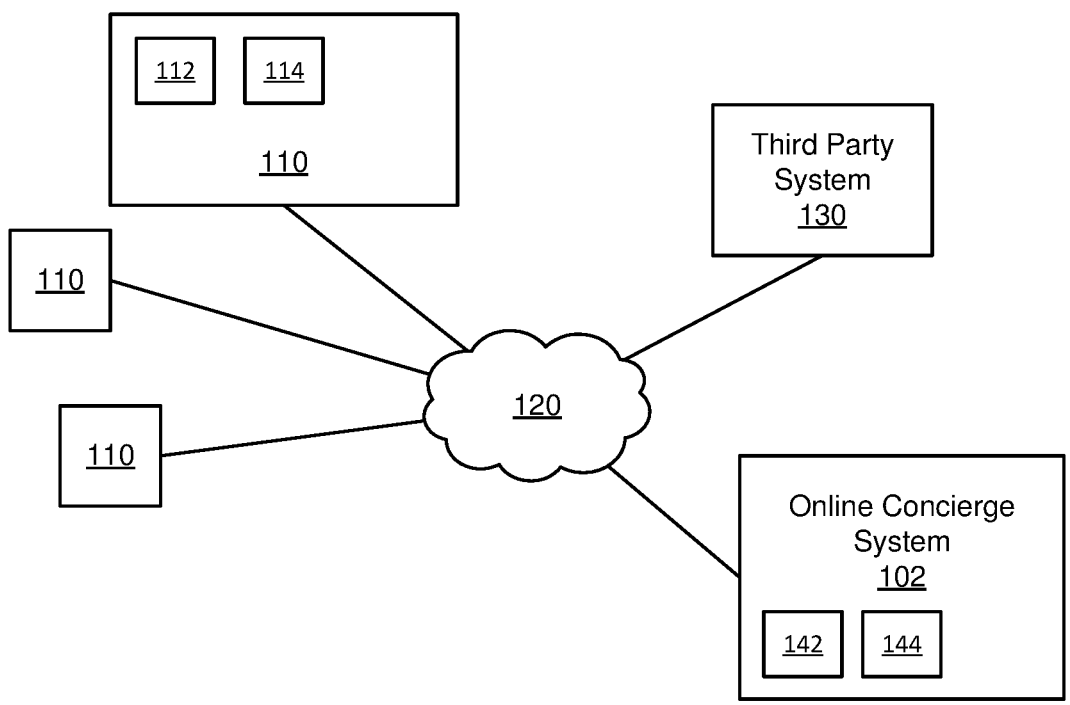
FIG. 1 is a block diagram of a system environment in which an online system, such an online concierge system, operates, according to one or more embodiments.

FIG. 1 is a block diagram of a system environment 100 in which an online system, such as an online concierge system 102 as further described below in conjunction with FIGS. 2 and 3, operates. The system environment 100 shown by FIG. 1 comprises one or more client devices 110, a network 120, one or more third-party systems 130, and the online concierge system 102. In alternative configurations, different and/or additional components may be included in the system environment 100. Additionally, in other embodiments, the online concierge system 102 may be replaced by an online system configured to retrieve content for display to users and to transmit the content to one or more client devices 110 for display.

The client devices 110 are one or more computing devices capable of receiving user input as well as transmitting and/or receiving data via the network 120. In one or more embodiments, a client device 110 is a computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one or more embodiments, a client device 110 executes an application allowing a user of the client device 110 to interact with the online concierge system 102. For example, the client device 110 executes a customer mobile application 206 or a shopper mobile application 212, as further described below in conjunction with FIGS. 4A and 4B, respectively, to enable interaction between the client device 110 and the online concierge system 102. As another example, a client device 110 executes a browser application to enable interaction between the client device 110 and the online concierge system 102 via the network 120. In another embodiment, a client device 110 interacts with the online concierge system 102 through an application programming interface (API) running on a native operating system of the client device 110, such as IOS® or ANDROID™.

A client device 110 includes one or more processors 112 configured to control operation of the client device 110 by performing functions. In various embodiments, a client device 110 includes a memory 114 comprising a non-transitory storage medium on which instructions are encoded. The memory 114 may have instructions encoded thereon that, when executed by the processor 112, cause the processor to perform functions to execute the customer mobile application 206 or the shopper mobile application 212 to provide the functions further described above in conjunction with FIGS. 4A and 4B, respectively.

The client devices 110 are configured to communicate via the network 120, which may comprise any combination of local area and/or wide area networks, using both wired and/or wireless communication systems. In one or more embodiments, the network 120 uses standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online concierge system 102 or with the one or more client devices 110. In one or more embodiments, a third party system 130 is an application provider communicating information describing applications for execution by a client device 110 or communicating data to client devices 110 for use by an application executing on the client device. In other embodiments, a third party system 130 provides content or other information for presentation via a client device 110. For example, the third party system 130 stores one or more web pages and transmits the web pages to a client device 110 or to the online concierge system 102. The third party system 130 may also communicate information to the online concierge system 102, such as advertisements, content, or information about an application provided by the third party system 130.

The online concierge system 102 includes one or more processors 142 configured to control operation of the online concierge system 102 by performing functions. In various embodiments, the online concierge system 102 includes a memory 144 comprising a non-transitory storage medium on which instructions are encoded. The memory 144 may have instructions encoded thereon corresponding to the modules further below in conjunction with FIG. 3 that, when executed by the processor 142, cause the processor to perform the functionality and various processes further described in this disclosure, for example in conjunction with FIGS. 2, 6 and 8. For example, the memory 144 has instructions encoded thereon that, when executed by the processor 142, cause the processor 142 to stratify historical query records of an item query engine according to the search frequencies of the search phrases in the queries and sample the historical query records accordingly to generate an unbiased representative set of historical query records for training of the item query engine. Additionally, the online concierge system 102 includes a communication interface configured to connect the online concierge system 102 to one or more networks, such as network 120, or to otherwise communicate with devices (e.g., client devices 110) connected to the one or more networks.

One or more of a client device, a third party system 130, or the online concierge system 102 may be special purpose computing devices configured to perform specific functions, as further described below in conjunction with FIGS. 2-9, and may include specific computing components such as processors, memories, communication interfaces, and/or the like.

System Overview

Figure 2:
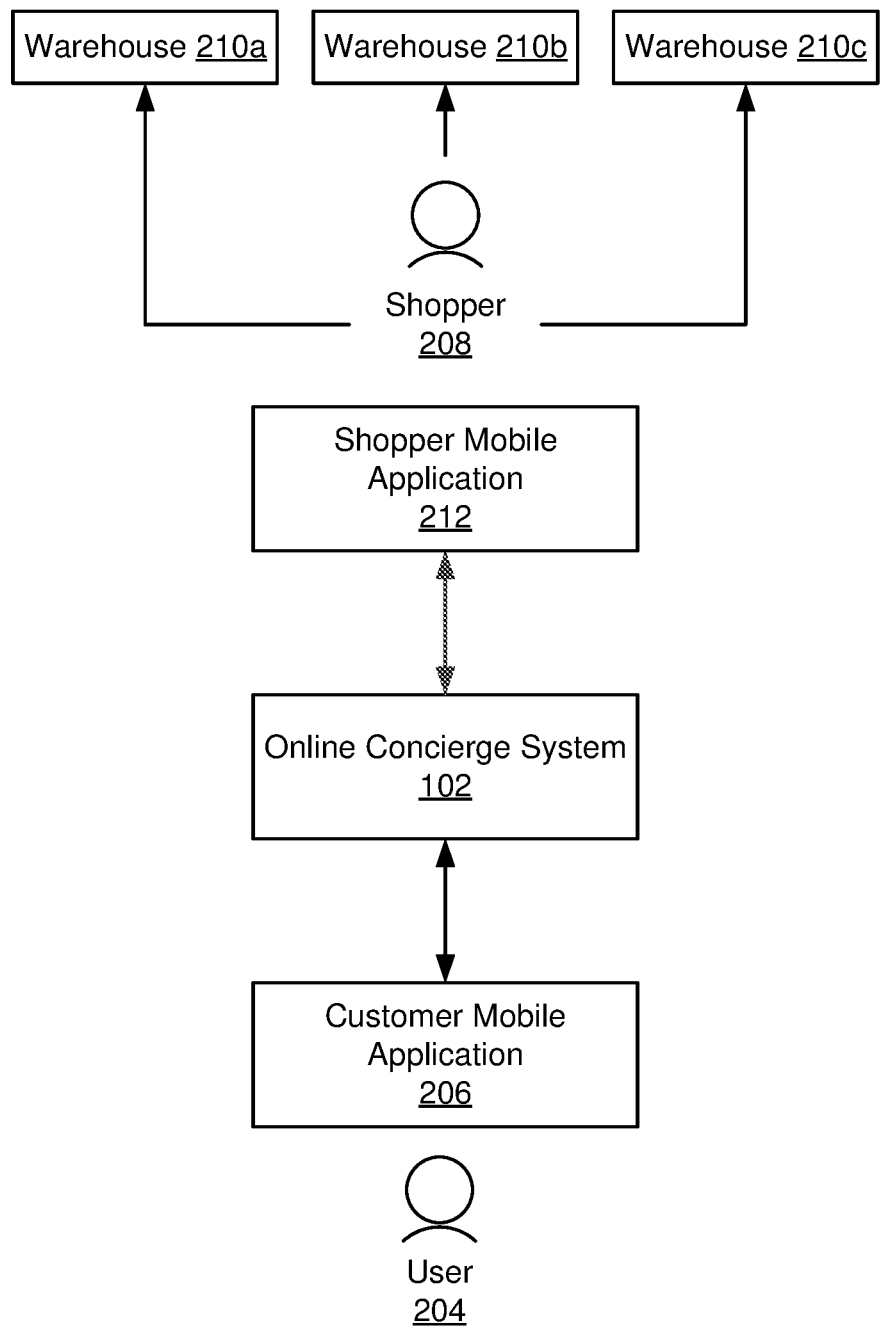
FIG. 2 illustrates an environment of an online shopping concierge service, according to one or more embodiments.

FIG. 2 illustrates an environment 200 of an online platform, such as an online concierge system 102, according to one or more embodiments. The figures use like reference numerals to identify like elements. A letter after a reference numeral, such as "210a," indicates that the text refers specifically to the element having that particular reference numeral. A reference numeral in the text without a following letter, such as "210," refers to any or all of the elements in the figures bearing that reference numeral. For example, "210" in the text refers to reference numerals "210a" or "210b" in the figures.

The environment 200 includes an online concierge system 102. The online concierge system 102 is configured to receive orders from one or more users 204 (only one is shown for the sake of simplicity). An order specifies a list of goods (items or products) to be delivered to the user 204. The order also specifies the location to which the goods are to be delivered, and a time window during which the goods should be delivered. In some embodiments, the order specifies one or more retailers from which the selected items should be purchased. The user may use a customer mobile application (CMA) 206 to place the order; the CMA 206 is configured to communicate with the online concierge system 102.

The online concierge system 102 is configured to transmit orders received from users 204 to one or more shoppers 208. A shopper 208 may be a contractor, employee, other person (or entity), robot, or other autonomous device enabled to fulfill orders received by the online concierge system 102. The shopper 208 travels between a warehouse and a delivery location (e.g., the user's home or office). A shopper 208 may travel by car, truck, bicycle, scooter, foot, or other mode of transportation. In some embodiments, the delivery may be partially or fully automated, e.g., using a self-driving car. The environment 200 also includes three warehouses 210a, 210b, and 210c (only three are shown for the sake of simplicity; the environment could include hundreds of warehouses). The warehouses 210 may be physical retailers, such as grocery stores, discount stores, department stores, etc., or non-public warehouses storing items that can be collected and delivered to users. Each shopper 208 fulfills an order received from the online concierge system 102 at one or more warehouses 210, delivers the order to the user 204, or performs both fulfillment and delivery. In one or more embodiments, shoppers 208 make use of a shopper mobile application 212 which is configured to interact with the online concierge system 102.

Figure 3:
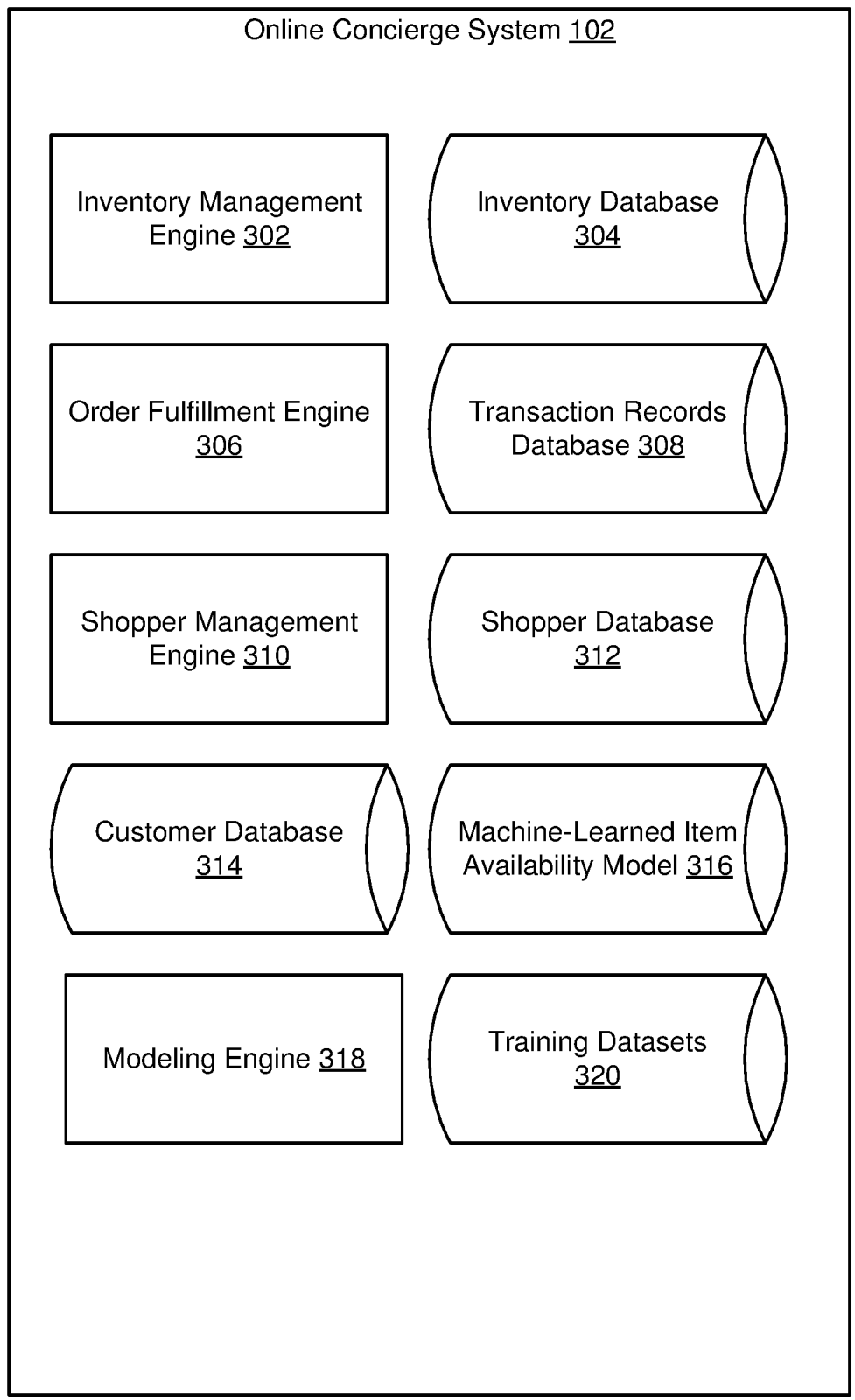
FIG. 3 is a diagram of an online shopping concierge system, according to one or more embodiments.

FIG. 3 is a diagram of an online concierge system 102, according to one or more embodiments. In various embodiments, the online concierge system 102 may include different or additional modules than those described in conjunction with FIG. 3. Further, in some embodiments, the online concierge system 102 includes fewer modules than those described in conjunction with FIG. 3.

The online concierge system 102 includes an inventory management engine 302, which interacts with inventory systems associated with each warehouse 210. In one or more embodiments, the inventory management engine 302 requests and receives inventory information maintained by the warehouse 210. The inventory of each warehouse 210 is unique and may change over time. The inventory management engine 302 monitors changes in inventory for each participating warehouse 210. The inventory management engine 302 is also configured to store inventory records in an inventory database 304. The inventory database 304 may store information in separate records—one for each participating warehouse 210—or may consolidate or combine inventory information into a unified record. Inventory information includes attributes of items that include both qualitative and qualitative information about items, including size, color, weight, SKU, serial number, and so on. In one or more embodiments, the inventory database 304 also stores purchasing rules associated with each item, if they exist. For example, age-restricted items such as alcohol and tobacco are flagged accordingly in the inventory database 304. Additional inventory information useful for predicting the availability of items may also be stored in the inventory database 304. For example, for each item-warehouse combination (a particular item at a particular warehouse), the inventory database 304 may store a time that the item was last found, a time that the item was last not found (a shopper looked for the item but could not find it), the rate at which the item is found, and the popularity of the item.

For each item, the inventory database 304 identifies one or more attributes of the item and corresponding values for each attribute of an item. For example, the inventory database 304 includes an entry for each item offered by a warehouse 210, with an entry for an item including an item identifier that uniquely identifies the item. The entry includes different fields, with each field corresponding to an attribute of the item. A field of an entry includes a value for the attribute corresponding to the attribute for the field, allowing the inventory database 304 to maintain values of different categories for various items.

In various embodiments, the inventory management engine 302 maintains a taxonomy of items offered for purchase by one or more warehouses 210. For example, the inventory management engine 302 receives an item catalog from a warehouse 210 identifying items offered for purchase by the warehouse 210. From the item catalog, the inventory management engine 302 determines a taxonomy of items offered by the warehouse 210. different levels in the taxonomy providing different levels of specificity about items included in the levels. In various embodiments, the taxonomy identifies a category and associates one or more specific items with the category. For example, a category identifies "milk," and the taxonomy associates identifiers of different milk items (e.g., milk offered by different brands, milk having one or more different attributes, etc.), with the category. Thus, the taxonomy maintains associations between a category and specific items offered by the warehouse 210 matching the category. In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a category, while items in higher levels of the hierarchical taxonomy have a fewer number of attributes, corresponding to less specificity in a category. In various embodiments, higher levels in the taxonomy include less detail about items, so greater numbers of items are included in higher levels (e.g., higher levels include a greater number of items satisfying a broader category). Similarly, lower levels in the taxonomy include greater detail about items, so fewer numbers of items are included in the lower levels (e.g., higher levels include a fewer number of items satisfying a more specific category). The taxonomy may be received from a warehouse 210 in various embodiments. In other embodiments, the inventory management engine 302 applies a trained classification module to an item catalog received from a warehouse 210 to include different items in levels of the taxonomy, so application of the trained classification model associates specific items with categories corresponding to levels within the taxonomy.

Inventory information provided by the inventory management engine 302 may supplement the training datasets 320. Inventory information provided by the inventory management engine 302 may not necessarily include information about the outcome of picking a delivery order associated with the item, whereas the data within the training datasets 320 is structured to include an outcome of picking a delivery order (e.g., if the item in an order was picked or not picked).

The online concierge system 102 also includes an order fulfillment engine 306 which is configured to synthesize and display an ordering interface to each user 204 (for example, via the customer mobile application 206). The order fulfillment engine 306 is also configured to access the inventory database 304 in order to determine which products are available at which warehouse 210. The order fulfillment engine 306 may supplement the product availability information from the inventory database 234 with an item availability predicted by the machine-learned item availability model 316. The order fulfillment engine 306 determines a sale price for each item ordered by a user 204. Prices set by the order fulfillment engine 306 may or may not be identical to in-store prices determined by retailers (which is the price that users 204 and shoppers 208 would pay at the retail warehouses). The order fulfillment engine 306 also facilitates transactions associated with each order. In one or more embodiments, the order fulfillment engine 306 charges a payment instrument associated with a user 204 when he/she places an order. The order fulfillment engine 306 may transmit payment information to an external payment gateway or payment processor. The order fulfillment engine 306 stores payment and transactional information associated with each order in a transaction records database 308.

In various embodiments, the order fulfillment engine 306 generates and transmits a search interface to a client device of a user for display via the customer mobile application 106. The order fulfillment engine 306 receives a query comprising one or more terms from a user and retrieves items satisfying the query, such as items having descriptive information matching at least a portion of the query. In various embodiments, the order fulfillment engine 306 leverages item embeddings for items to retrieve items based on a received query. For example, the order fulfillment engine 306 generates an embedding for a query and determines measures of similarity between the embedding for the query and item embeddings for various items included in the inventory database 304.

In some embodiments, the order fulfillment engine 306 also shares order details with warehouses 210. For example, after successful fulfillment of an order, the order fulfillment engine 306 may transmit a summary of the order to the appropriate warehouses 210. The summary may indicate the items purchased, the total value of the items, and in some cases, an identity of the shopper 208 and user 204 associated with the transaction. In one or more embodiments, the order fulfillment engine 306 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 306, which provides detail of all orders which have been processed since the last request.

The order fulfillment engine 306 may interact with a shopper management engine 310, which manages communication with and utilization of shoppers 208. In one or more embodiments, the shopper management engine 310 receives a new order from the order fulfillment engine 306. The shopper management engine 310 identifies the appropriate warehouse 210 to fulfill the order based on one or more parameters, such as a probability of item availability determined by a machine-learned item availability model 316, the contents of the order, the inventory of the warehouses, and the proximity to the delivery location. The shopper management engine e10 then identifies one or more appropriate shoppers 208 to fulfill the order based on one or more parameters, such as the shoppers' proximity to the appropriate warehouse 210 (and/or to the user 204), his/her familiarity level with that particular warehouse 210, and so on. Additionally, the shopper management engine 310 accesses a shopper database 312 which stores information describing each shopper 208, such as his/her name, gender, rating, previous shopping history, and so on.

As part of fulfilling an order, the order fulfillment engine 306 and/or shopper management engine 310 may access a user database 314 which stores information describing each user. This information could include each user's name, address, gender, shopping preferences, favorite items, stored payment instruments, and so on.

In various embodiments, the order fulfillment engine 306 determines whether to delay display of a received order to shoppers for fulfillment by a time interval. In response to determining to delay the received order by a time interval, the order fulfilment engine 306 evaluates orders received after the received order and during the time interval for inclusion in one or more batches that also include the received order. After the time interval, the order fulfillment engine 306 displays the order to one or more shoppers via the shopper mobile application 212; if the order fulfillment engine 306 generated one or more batches including the received order and one or more orders received after the received order and during the time interval, the one or more batches are also displayed to one or more shoppers via the shopper mobile application 212.

The online concierge system 102 further includes a machine-learned item availability model 316, a modeling engine 318, and training datasets 320. The modeling engine 318 uses the training datasets 320 to generate the machine-learned item availability model 316. The machine-learned item availability model 316 can learn from the training datasets 320, rather than follow only explicitly programmed instructions. The inventory management engine 302, order fulfillment engine 306, and/or shopper management engine 310 can use the machine-learned item availability model 316 to determine a probability that an item is available at a warehouse 210. The machine-learned item availability model 316 may be used to predict item availability for items being displayed to or selected by a user or included in received delivery orders. A single machine-learned item availability model 316 is used to predict the availability of any number of items.

The machine-learned item availability model 316 can be configured to receive as inputs information about an item, the warehouse for picking the item, and the time for picking the item. The machine-learned item availability model 316 may be adapted to receive any information that the modeling engine 318 identifies as indicators of item availability. At minimum, the machine-learned item availability model 316 receives information about an item-warehouse pair, such as an item in a delivery order and a warehouse at which the order could be fulfilled. Items stored in the inventory database 304 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 304. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 304 and/or warehouse database and provide this extracted information as inputs to the item availability model 316.

The machine-learned item availability model 316 contains a set of functions generated by the modeling engine 318 from the training datasets 320 that relate the item, warehouse, and timing information, and/or any other relevant inputs, to the probability that the item is available at a warehouse. Thus, for a given item-warehouse pair, the machine-learned item availability model 316 outputs a probability that the item is available at the warehouse. The machine-learned item availability model 316 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 316 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper or predicted to be unavailable but found by the shopper). In some examples, the confidence score is based in part on the age of the data for the item, e.g., if availability information has been received within the past hour, or the past day. The set of functions of the item availability model 316 may be updated and adapted following retraining with new training datasets 320. The machine-learned item availability model 316 may be any machine learning model, such as a neural network, boosted tree, gradient boosted tree or random forest model. In some examples, the machine-learned item availability model 316 is generated from XGBoost algorithm.

The item probability generated by the machine-learned item availability model 316 may be used to determine instructions delivered to the user 204 and/or shopper 208, as described in further detail below.

The training datasets 320 relate a variety of different factors to known item availabilities from the outcomes of previous delivery orders (e.g., if an item was previously found or previously unavailable). The training datasets 320 include the items included in previous delivery orders, whether the items in the previous delivery orders were picked, warehouses associated with the previous delivery orders, and a variety of characteristics associated with each of the items (which may be obtained from the inventory database 304). Each piece of data in the training datasets 320 includes the outcome of a previous delivery order (e.g., if the item was picked or not). The item characteristics may be determined by the machine-learned item availability model 316 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 316 may weight these factors differently, where the weights are a result of a "learning" or training process on the training datasets 320. The training datasets 320 are very large datasets taken across a wide cross section of warehouses, shoppers, items, warehouses, delivery orders, times, and item characteristics. The training datasets 320 are large enough to provide a mapping from an item in an order to a probability that the item is available at a warehouse. In addition to previous delivery orders, the training datasets 320 may be supplemented by inventory information provided by the inventory management engine 302. In some examples, the training datasets 320 are historic delivery order information used to train the machine-learned item availability model 316, whereas the inventory information stored in the inventory database 304 include factors input into the machine-learned item availability model 316 to determine an item availability for an item in a newly received delivery order. In some examples, the modeling engine 318 may evaluate the training datasets 320 to compare a single item's availability across multiple warehouses to determine if an item is chronically unavailable. This may indicate that an item is no longer manufactured. The modeling engine 318 may query a warehouse 210 through the inventory management engine 302 for updated item information on these identified items.

The training datasets 320 include a time associated with previous delivery orders. In some embodiments, the training datasets 320 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 320 include a day of the week previous delivery orders were placed. The day of the week may impact item availability since popular shopping days may have reduced inventory of items or restocking shipments may be received on particular days. In some embodiments, training datasets 320 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 320 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked and is available for subsequent delivery orders. In some examples, training datasets 320 may also include a rate at which an item is typically found by a shopper at a warehouse, a number of days since inventory information about the item was last received from the inventory management engine 302, a number of times an item was not found in a previous week, or any number of additional rate or time information. The relationships between this time information and item availability are determined by the modeling engine 318 training a machine learning model with the training datasets 320, producing the machine-learned item availability model 316.

The training datasets 320 include item characteristics. In some examples, the item characteristics include a department associated with the item. For example, if the item is yogurt, it is associated with the dairy department. The department may be the bakery, beverage, nonfood, and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 302. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 318 training a machine learning model with the training datasets 320, producing the machine-learned item availability model 316.

The training datasets 320 may include additional item characteristics that affect the item availability and can therefore be used to build the machine-learned item availability model 316 relating the delivery order for an item to its predicted availability. The training datasets 320 may be periodically updated with recent previous delivery orders. The training datasets 320 may be updated with item availability information provided directly from shoppers 208. Following updating of the training datasets 320, a modeling engine 318 may retrain a model with the updated training datasets 320 and produce a new machine-learned item availability model 316.

Customer Mobile Application

Figure 4A:
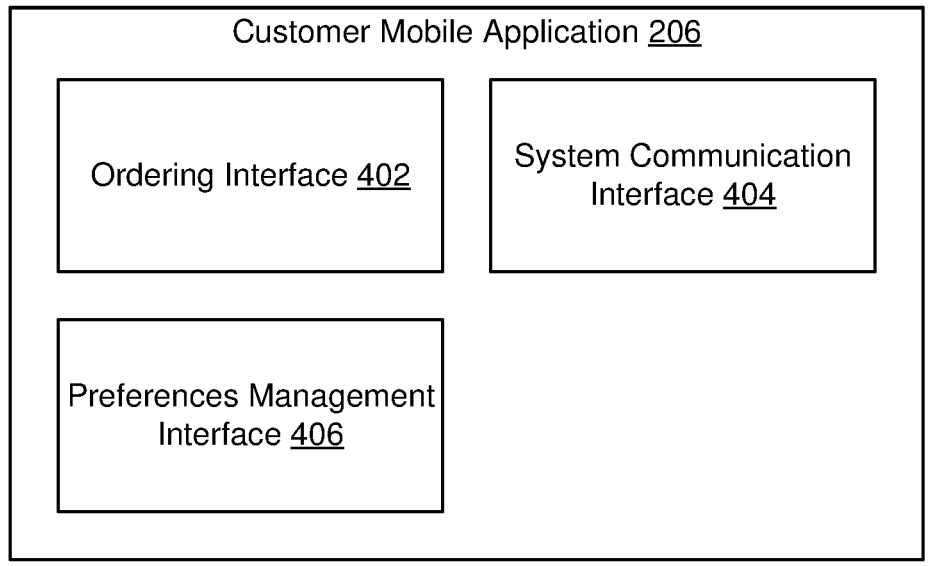
FIG. 4A is a diagram of a customer mobile application (CMA), according to one or more embodiments.

FIG. 4A is a diagram of the customer mobile application (CMA) 206, according to one or more embodiments. The CMA 206 includes an ordering interface 402, which provides an interactive interface with which the user 104 can browse through and select products and place an order. The CMA 206 also includes a system communication interface 404 which, among other functions, receives inventory information from the online shopping concierge system 102 and transmits order information to the system 102. The CMA 206 also includes a preferences management interface 406 which allows the user 104 to manage basic information associated with his/her account, such as his/her home address and payment instruments. The preferences management interface 406 may also allow the user to manage other details such as his/her favorite or preferred warehouses 210, preferred delivery times, special instructions for delivery, and so on.

Shopper Mobile Application

Figure 4B:
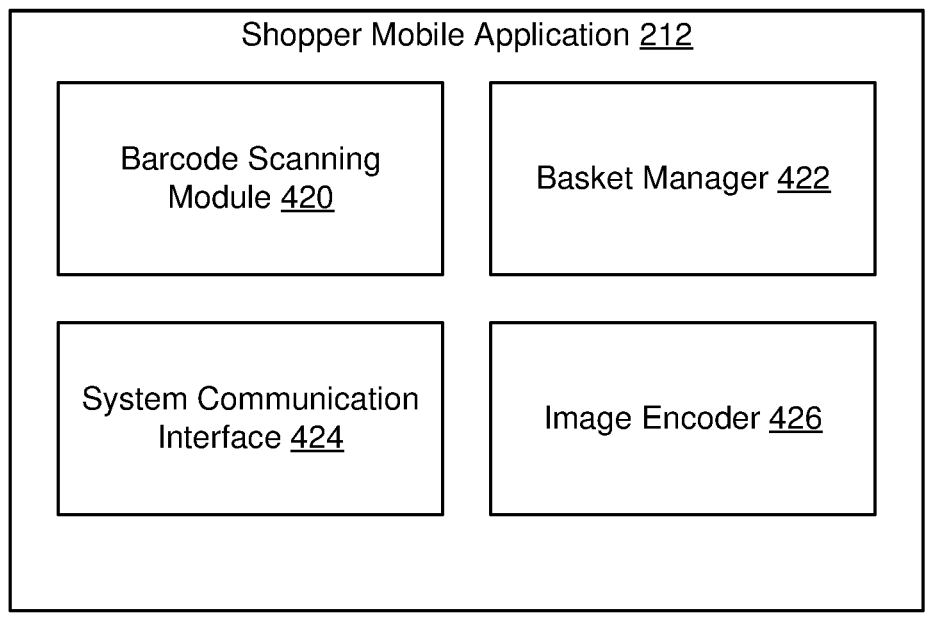
FIG. 4B is a diagram of a shopper mobile application (SMA), according to one or more embodiments.

FIG. 4B is a diagram of the shopper mobile application (SMA) 212, according to one or more embodiments. The SMA 212 includes a barcode scanning module 420 which allows a shopper 208 to scan an item at a warehouse 210 (such as a can of soup on the shelf at a grocery store). The barcode scanning module 420 may also include an interface which allows the shopper 108 to manually enter information describing an item (such as its serial number, SKU, quantity and/or weight) if a barcode is not available to be scanned. SMA 212 also includes a basket manager 422 which maintains a running record of items collected by the shopper 208 for purchase at a warehouse 210. This running record of items is commonly known as a "basket." In one or more embodiments, the barcode scanning module 420 transmits information describing each item (such as its cost, quantity, weight, etc.) to the basket manager 422, which updates its basket accordingly. The SMA 212 also includes a system communication interface 424 which interacts with the online shopping concierge system 102. For example, the system communication interface 424 receives an order from the online concierge system 102 and transmits the contents of a basket of items to the online concierge system 102. The SMA 212 also includes an image encoder 426 which encodes the contents of a basket into an image. For example, the image encoder 426 may encode a basket of goods (with an identification of each item) into a QR code which can then be scanned by an employee of the warehouse 210 at check-out.

Example Graphical User Interfaces

Figure 5:
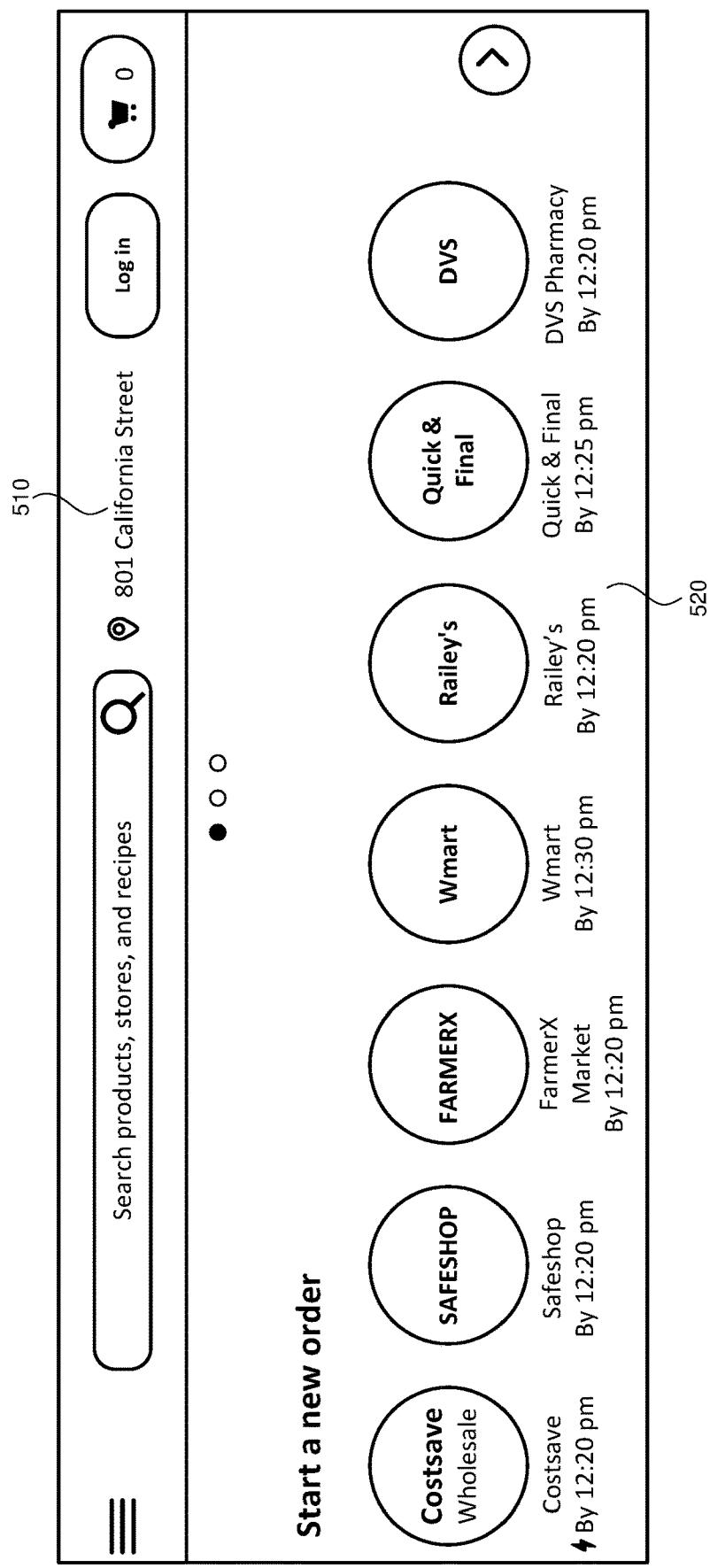
FIG. 5 is a conceptual diagram that illustrates a graphical user interface provided by the online concierge system, according to an embodiment.

FIG. 5 is a conceptual diagram that illustrates a graphical user interface 500 provided by the online concierge system 102, according to an embodiment. The graphical user interface 500 may be part of a software application that is in communication with the online concierge system 102. The software application or the graphical user interface 500 may take different forms. For example, the software application may be a mobile application that is installed on a user mobile device (e.g., a smartphone) and the graphical user interface 500 is part of the user interface of the mobile application. In another example, the graphical user interface 500 may also take the form of a website of the online concierge system 102. In yet another example, the graphical user interface 500 may be part of a web application.

The graphical user interface 500 provides options for a user to browse the time-sensitive datasets of different third-party systems. In some embodiments, the online concierge system 102 may be partnered, contracted, or otherwise connected with one or more third-party systems to allow users of the online concierge system 102 to view dynamic item entries of different third-party systems and interact directly or indirectly with the third-party systems. Each third-party system may include different physical locations. Each physical location may be documented by a time-sensitive dataset that includes dynamic item entries that vary in the course of the operation of the physical location. For example, the physical locations may be brick-and-mortar stores or other service locations of the third-party system. A time-sensitive dataset may be constantly changing based on the operation and conditions of the physical location. The term third-party system may be viewed from the perspective of the online concierge system 102 and may refer to parties that are not the same entities as the online concierge system 102. However, in some embodiments, the online concierge system 102 may also have stores and it is also listed in the list 520 along with the third-party systems. The methods and systems described in this disclosure may also apply to the stores of the online concierge system 102, although example embodiments will be mainly discussed with the interaction of a third-party system.

The stage displayed in the graphical user interface 500 may be a part of a session, such as a web browser session, in which a user device may request a physical arrangement between an agent of the online concierge system 102 and the third-party system at a physical location of the third-party system. An agent of the online concierge system 102 may be an employee, a contractor, or simply an end user who is temporarily involved in a transaction of the online concierge system 102. For example, an agent may be a shopper 208 who receives commands or an order list from the online concierge system 102 via the shopper mobile application 212. While oftentimes an agent will be paid by the online concierge system 102, compensation, control, or communication between the online concierge system 102 and the agent may not be the determining factor to determine whether a particular person is an agent of the online concierge system 102. An example of the agent of the online concierge system 102 may be a temporary helper who uses the shopper mobile application 212 to help pick up goods in a gig economy. In some embodiments, the agent may also be a robotic agent such as a robot that is capable of picking up items and delivering the items to the user using an autonomous vehicle.

In various embodiments, the third-party systems, the physical arrangement, the time-sensitive dataset, and the dynamic item entries may take different forms, depending on the context and implementations of various embodiments.

For example, in some embodiments, the context is an online concierge system 102 is a grocery shopping experience. In this context, third-party systems may be company systems that operate different grocery stores, pharmacies, supermarkets, membership warehouse clubs, etc. For example, a third-party system may be a grocery chain that has different physical stores. The online concierge system 102 may be in collaboration with different third-party systems so that users may view datasets associated with different third-party systems at a single graphical user interface 500. The physical arrangement may involve sending an agent of the online concierge system 102 to a physical store of a grocery chain to perform tasks requested from a user, such as locating items and picking up orders on behalf of the user. In the context of grocery shopping, the time-sensitive data may take the form of an inventory dataset that documents the availability and sales of items at different physical locations. The dynamic item entries may correspond to the data entries that record the inventory levels, such as availabilities of items and quantities remaining of items.

The natures of the third-party systems, the physical arrangement, the time-sensitive dataset and the dynamic item entries may change in a different context. For example, a third-party system may be a chain restaurant brand that has different restaurants and the physical arrangement may be picking up foods from a restaurant based on an online order of a user of the online concierge system 102 through the graphical user interface 500. The time-sensitive dataset may correspond to an available menu of the restaurant that may change from day to day and time to time. In another embodiment, the third-party systems may be any retail chains that have different item offering in various retail stores. The physical arrangement may be shopping or picking up of online orders for a user of the online concierge system 102. The time-sensitive dataset may correspond to the available items of a retail location at a given time. While a few examples of implementations are explicitly disclosed here, other embodiments are also possible for using the various processes described in this disclosure. The rest of the disclosure may be described using grocery shopping as an example, but the disclosed methods and systems can be applied to other settings without further explanation.

The graphical user interface 500 may allow the user to specify a delivery location 510 and enter various user-specific information and preference choices. The graphical user interface 500 provides a list 520 of third-party systems for the user to select. Some of the third-party systems may have multiple stores that are within a threshold distance from the location of the user. Each store may have different offerings that are available for users to shop due to the availability of inventory, the size of the store, any supply condition and other factors. The online concierge system 102, upon receipt of a choice of third-party system, may automatically select a store that maximizes the number of offerings that are available for the user to select, such as determining the store that has the largest inventory available. The online concierge system 102 automatically selects a time-sensitive dataset, such as an available inventory data list corresponding to a physical location of the selected third-party system, and displays the dynamic item entries at the graphical user interface 500 for the user to view and select.

The online concierge system 102 may improve a graphical user interface by providing a single virtual storefront from multiple physical stores of a third-party system. By way of example, a user, using the graphical user interface 500, may select one of the third-party systems. The user may intend to hire or otherwise use another person to carry out the physical transaction with a physical store of the selected third-party system. For example, the physical transaction may be making a purchase, picking up an order, making a return, performing a shipment, or a combination of any of those activities. The other person who carries out the physical transaction may be another user who uses the online concierge system 102 and voluntarily accepts the task in exchange for benefits such as compensations, credits, or other advantages and becomes an agent of the online concierge system 102. The physical transaction may be an example of the physical arrangement between an agent of the online system and the third-party system. To reduce the cost of the physical arrangement, the transaction may be limited to a single physical location or only a limited number of physical locations that are local to the geographical location of the user. Hence, even though a given third-party system's entire inventory offering may be significantly more than a single physical store may offer, the third-party system may need a different store front for each physical location due to the difference in the product offering. According to some embodiments, the online concierge system 102 provides an improved graphical user interface by providing a virtual storefront for multiple physical stores that each carry different items.

In some embodiments, the online concierge system 102, upon receiving the selection from the user of a third-party system, automatically selects one of the physical locations that have a time-sensitive dataset (e.g., an available inventory list) that is the largest or the most suited for the user among the physical locations that are in reasonable proximity of the user location. In such a case, the user may interact with the third-party system's offering as if the third-party system has a single set of available inventories. In some embodiments, this avoids having the user manually go through each of the physical location store fronts and compare the items offered in each physical store, which could sometimes be a negative experience for the user due to the potential frustration of having to switch back and forth among multiple stores. However, in some embodiments, while the online concierge system 102 initially automatically selects a physical location and displays the time-sensitive datasets associated with the selected location, the online concierge system 102 may still allow the user to manually override the selection and pick another physical location.

Figure 6:
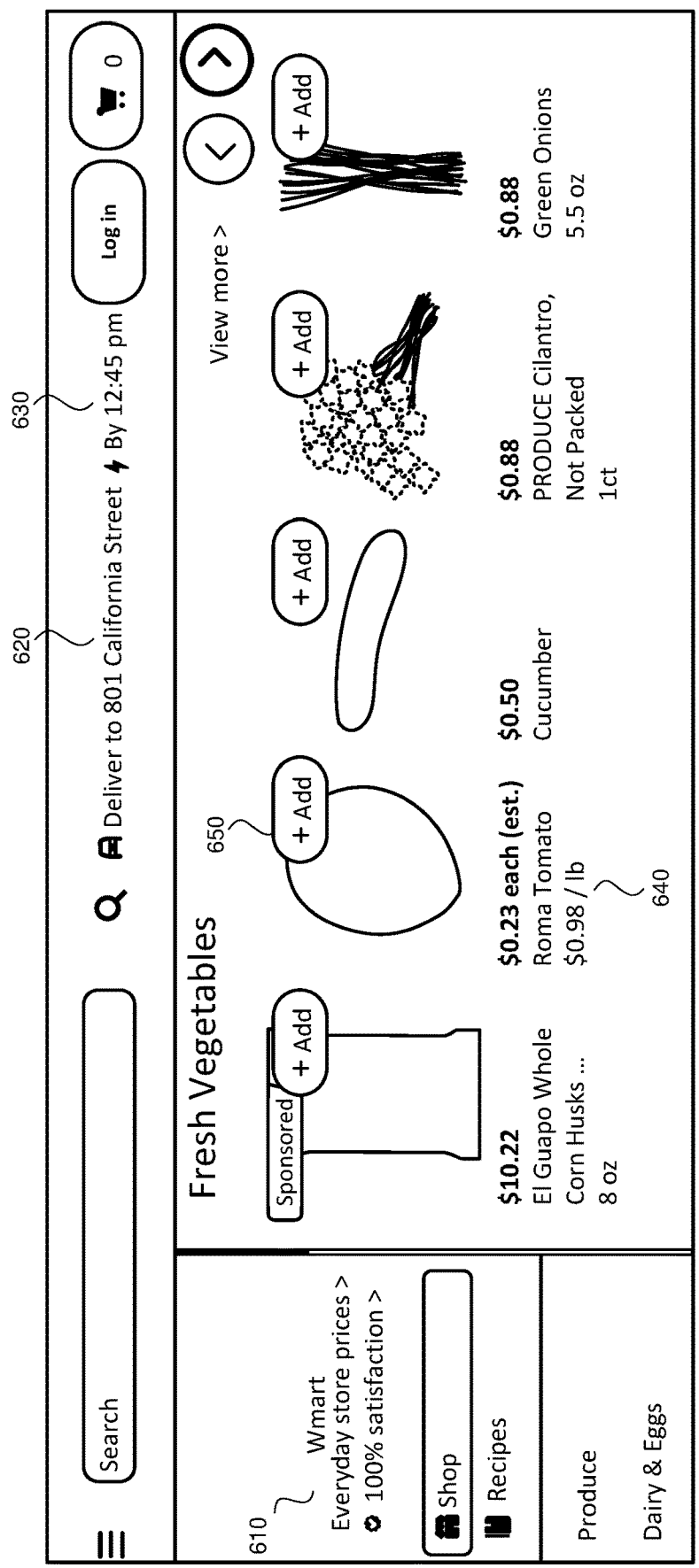
FIG. 6 is a conceptual diagram illustrating an example graphical user interface that may serve as a single virtual store front for multiple physical locations of a third party system, according to an embodiment.

FIG. 6 is a conceptual diagram illustrating an example graphical user interface 600 that may serve as a single virtual store front for multiple physical locations of a third-party system, according to an embodiment. The graphical user interface 600 may belong to the same session (e.g., same web session) of the graphical user interface 500 and may be a page that is displayed after the user selects a third-party system. Upon receiving the selection of one of the third-party systems from the list 520, the online concierge system 102 may retrieve the time-sensitive datasets corresponding to various physical locations of the third-party system. The online concierge system 102 may determine a metric measuring the size of the dynamic item entries available in the time-sensitive dataset corresponding to each physical location and automatically select one of the physical locations based on the metric. The online concierge system 102 causes the graphical user interface 600 to display the dynamic item entries in the time-sensitive dataset associated with the selected physical location.

The set of elements shown in FIG. 6 may be an example of the result of the online concierge system 102 automatically selecting a physical location of the third-party system and providing a single virtual store front for the third-party system. In the graphical user interface 600, the field 610 displays the third-party system that is selected. In some embodiments, the graphical user interface 600, such as in the example of FIG. 6, does not further specify the specific physical location of the selected third-party system because the graphical user interface 600 may be presented as a single virtual storefront of the selected third-party system. In other embodiments, the single virtual storefront may still display the physical location selected to allow the user to further customize the location even though the online concierge system 102 may first automatically select a physical location. The graphical user interface 600 may also include a geographical location 620 that is specified by the user. The geographical location 620 shown in this example is a delivery address. The graphical user interface 600 may also have a temporal element 630, such as an estimated delivery time or a delivery deadline. The temporal element 630 may affect the dynamic items contained in the time-sensitive dataset.

The graphical user interface 600 displays a list of dynamic item entries 640 in the time-sensitive dataset. In this example, the time-sensitive dataset may correspond to a list of available inventories at a particular timeframe. The timeframe may be in the magnitude of week, day, hour, or minute, depending on the embodiments. The dynamic item entries 640 may correspond to data entries that represent product items of the physical stores and the price of the product items at the particular timeframe. The inventory and pricing of various items are dynamically changing as the physical store operates. The online concierge system 102 may retrieve the data from the third-party system in various ways, such as through an application programming interface (API) of the third-party system. In other embodiments, the online concierge system 102 may also manage or collaborate with the third-party system to manage the time-sensitives datasets of various physical locations on behalf of the third-party system. The user, through the graphical user interface 600, may select, using the control element 650, one or more items to be added to be part of the physical arrangement for an agent of the online concierge system 102 to carry out a physical transaction with the physical location.

Example Time-Sensitive Dataset Selecting

Figure 7:
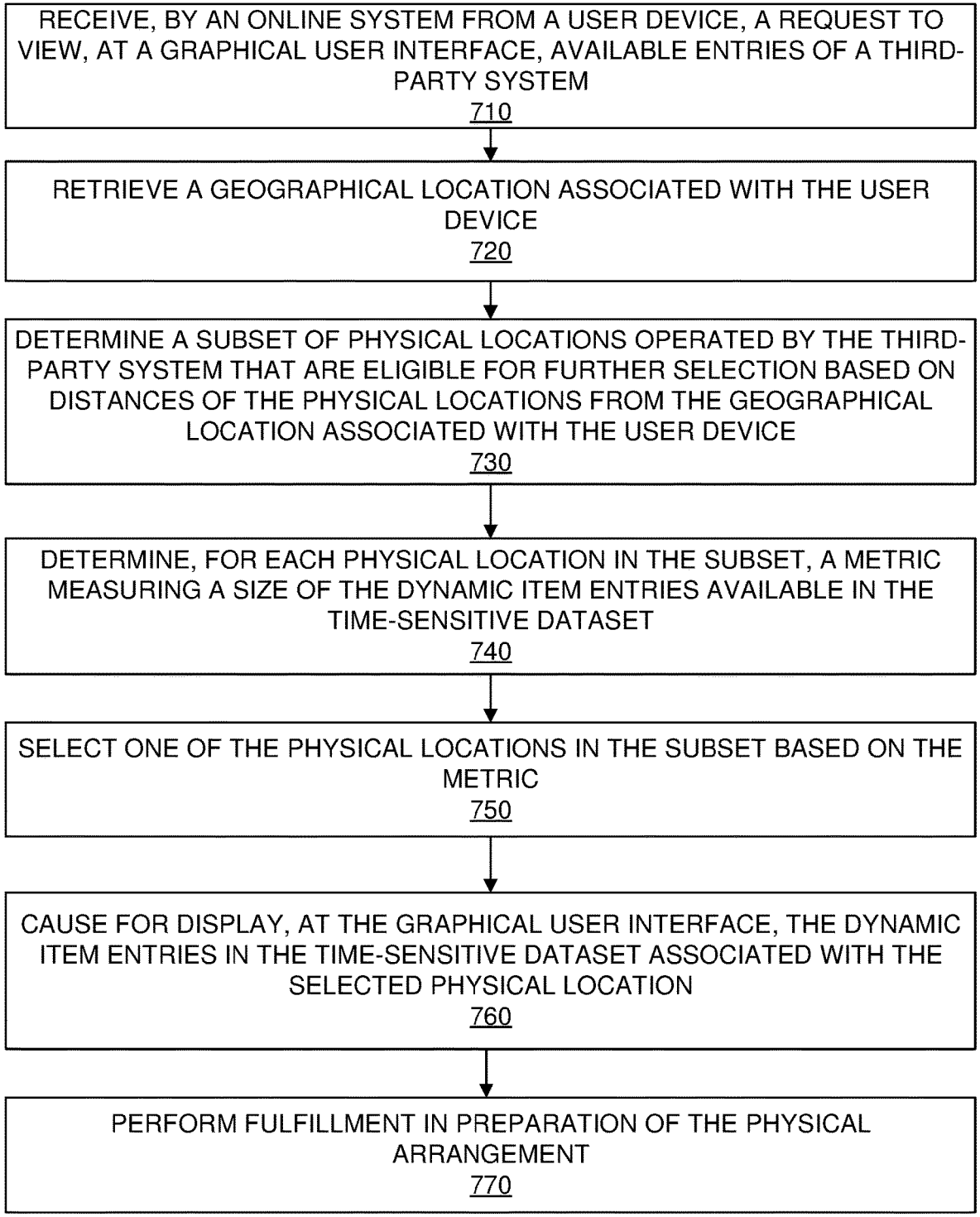
FIG. 7 is a flowchart depicting an example process for the online concierge system to automatically select a time-sensitive dataset, according to an embodiment.

FIG. 7 is a flowchart depicting an example process 700 for the online concierge system 102 to automatically select a time-sensitive dataset, according to an embodiment. In various embodiments, the process 700 includes different or additional steps than those described in conjunction with FIG. 7. Further, in some embodiments, the steps of the process 700 may be performed in different orders than the order described in conjunction with FIG. 7. The process 700 may be carried out by the online concierge system 102 in various embodiments. In other embodiments, the steps of the process 700 are performed by any suitable online system.

The online concierge system 102 receives 710, from a user device, a request to view, at a graphical user interface, available entries of a third-party system. The request may be a part of a session in which the user device requests a physical arrangement between an agent of the online system and the third-party system at a physical location of the third-party system. For example, the user may be in a web session using the graphical user interface 500, intending to shop at one of the third-party systems and request the online concierge system 102 to have someone pick up the order and deliver the order to the user's dwelling. The user selects the third-party system from the list 520 as a form to request the user interface to display available items of the third-party system. The online concierge system 102 receives the request and carries out the process 700 to display available data entries (e.g., available product items) of the third-party system. In some embodiments, the third-party system operates multiple physical locations. The operation of each physical location is documented by a time-sensitive dataset which includes various dynamic item entries that vary in a course of the operation of the physical location. For example, a physical location of the third-party system is a physical store and the time-sensitive dataset may take the form of an available inventory dataset and/or transaction records that may adjust the available inventory frequently during the operation hours of the physical location. The time-sensitive dataset may be stored in the inventory database 304 and/or the transaction records database 308. The time-sensitive dataset may include various dynamic item entries. Each dynamic item entry may correspond to an item and include fields such as availability of the item, quantity left at a specific timeframe, price of the item at the timeframe, and other information that may be static or dynamically changed.

The online concierge system 102 retrieves 720 a geographical location associated with the user device. The geographical location that is associated with the user device may be a different kind of location, depending on embodiments. In some embodiments, the geographical location associated with the user device is a delivery address that is manually entered by the user. In some embodiments, the geographical location associated with the user device is automatically detected by retrieving the global position system of the user device. In some embodiments, the geographical location associated with the user device may also be a city, a neighborhood, or a zip code entered by the user using the user device or automatically detected by the user device. In some embodiments, the geographical location at this stage does not always need to be at a precise level that allows the online concierge system 102 to determine the delivery address. For example, the user may specify the precise delivery address at the checkout. In some embodiments, the geographical location associated with the user device may be a saved record that is retrieved based on a cookie stored in the user device. The geographical location may be any suitable location, whether manually entered or automatically detected and whether based on current information or historical information.

The online concierge system 102 determines 730 a subset of physical locations operated by the third-party system that are eligible for further selection based on distances of the physical locations from the geographical location associated with the user device. For example, the online concierge system 102 may retrieve a list of physical locations that are in the state, county or a suitable large geographical boundary. Each physical location may be associated with a distance radius that may represent the service area of the physical location. The physical locations that have service areas that cover the geographical location associated with the user device may be selected as the subset of physical locations that are eligible for further selection.

Figure 8:
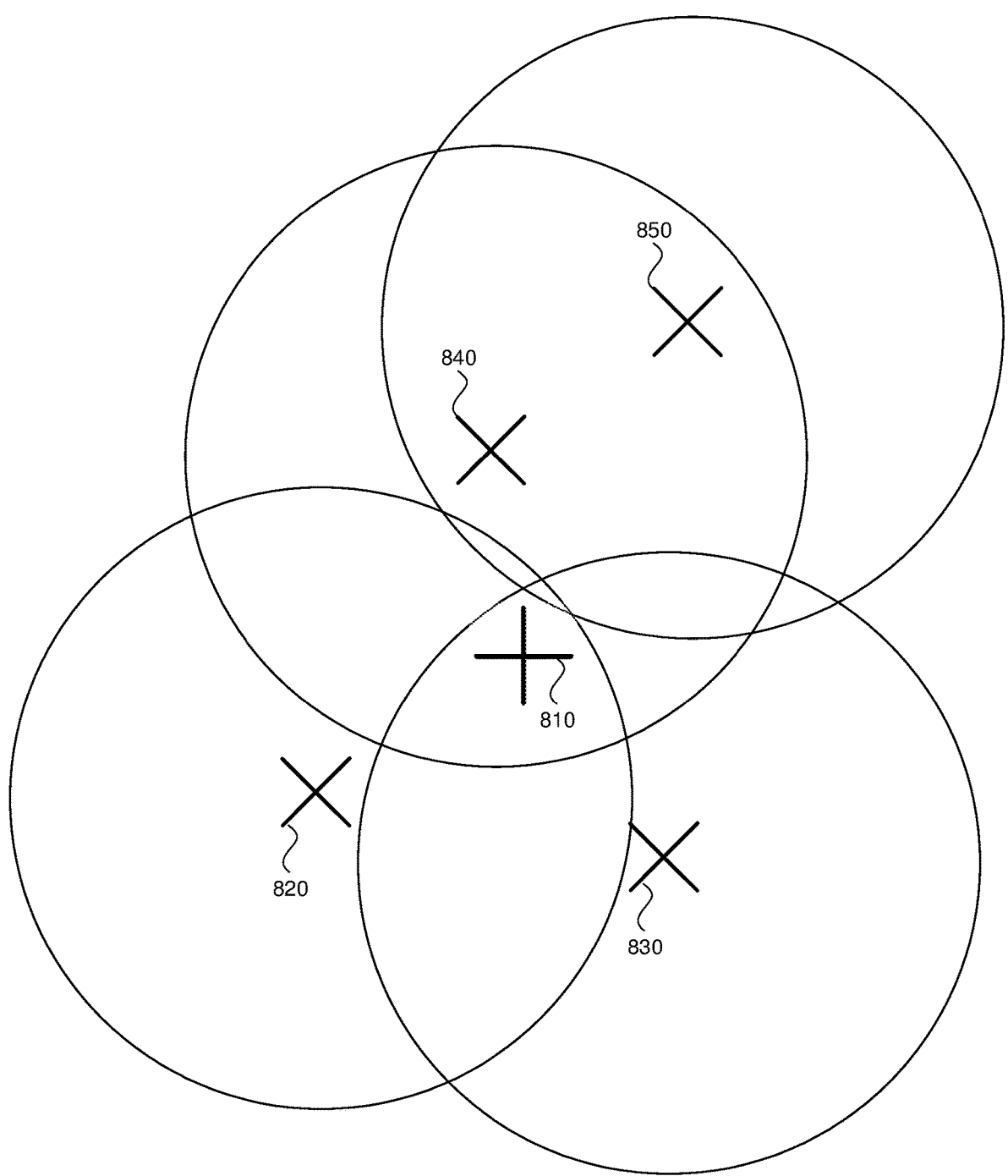
FIG. 8 is a conceptual diagram that illustrates the selection of physical locations, according to an embodiment.

FIG. 8 is a conceptual diagram that illustrates the selection of physical locations, according to an embodiment. The center cross 810 represents the geographical location associated with the user device. The other crosses 820, 830, 840, and 850 represent four different physical locations (e.g., store locations) of a third-party system. Each physical location is associated with a radius that forms a circle to represent the service area corresponding to the physical location. Hence, in the example shown in FIG. 8, physical locations 820, 830 and 840 may be selected as the subset that is eligible for further selection. Note that the circle in FIG. 8 is an example only and the service area monitored by the online concierge system 102 may not be determined by the geometrical radial distance. For example, the online concierge system 102 may maintain a map with actual streets and other traffic information. The radius may be determined by the traveling time (e.g., 30 minutes, 60 minutes) instead of the geographically shortest distance. Hence, the service area may be in an irregular shape that is based on the routing algorithm and statistics of actual traveling distance. As such, in various embodiments, the distance between a physical location and the geographical location associated with the user device may be determined by actual geographical distance, traveling time, or another suitable way.

The determination of service distances of various physical locations based on travel time may be referred to as smart service areas. The smart service areas may be associated with different tiers, each tier having a travel distance limit. If the online concierge system 102 is not able to find a suitable physical location within a service tier, the online concierge system 102 may expand to search to another service tier. For example, the online concierge system 102 may select all physical locations that are within 30 minutes of the geographical location associated with the user device. If no physical location is available, the online concierge system 102 may expand the search to 60 minutes. This may allow the online concierge system 102 to reduce fulfillment costs for the user for the physical arrangement as the user may need to pay fees for the physical arrangement based on the distance of delivery.

In some embodiments, the determination of the subset of physical locations that are eligible for further selection may also be based on the geographical locations of candidate agents that are available to provide service at a given timeframe. For example, the online concierge system 102 may determine a list of candidate agents of the online system who are able to provide service. The online concierge system 102 may determine the geographical locations of the list of candidate agents. The online concierge system 102 may determine the subset of physical locations further based on predicted distances of the physical arrangement carried out by the candidate agents. For example, the online concierge system 102 may calculate the estimated total travel distances (e.g., the distance for the agent to travel to a physical store and deliver the items to the user) of the physical arrangement and select stores that have estimated total distances.

The online concierge system 102 may also determine the subset of physical locations that are eligible for further selection based on the status of the physical locations at the time at which the physical arrangement is scheduled to occur. For example, the online concierge system 102 may only select open stores for certain hours. This would be helpful, especially during late-night hours when the stores in the proximity of the geographical location associated with the user device may be closed.

Referring back to FIG. 7, the online concierge system 102 determines 740, for each physical location in the subset, a metric measuring the size of the dynamic item entries available in the time-sensitive dataset. The online concierge system 102 retrieves time-sensitive datasets corresponding to the physical locations in the selected subset and determines the metric value for each of the time-sensitive datasets corresponding to the physical location.

The data regarding time-sensitive datasets may be updated periodically. The frequency of how often the time-sensitive datasets are uploaded may vary depending on embodiments. For example, in some embodiments, the inventory information of the physical stores of a third-party system may be updated daily. In other embodiments, the update of the data may occur more frequently. In some embodiments, the online concierge system 102 may receive real-time transaction records from the third-party system or from the physical stores directly. For example, in one case, the online concierge system 102 may be connected to the point-of-sale (POS) systems (e.g., checkout devices, cashiers) of the physical stores and may monitor the real-time change in an inventory level of the physical stores. In such an example, the time-sensitive datasets may be updated in real-time or close to real-time.

The retrieval of the time-sensitive datasets may be carried out in different ways in various embodiments. In some embodiments, the online concierge system 102 retrieves the data directly from the third-party system through one or more APIs established between the third-party system and the online concierge system 102. In some embodiments, the time-sensitive datasets are stored in the inventory database 304 and/or the transaction records database 308. In some embodiments, the time-sensitive datasets are maintained by the online concierge system 102. For example, the online concierge system 102 may be connected to the POS systems of a physical store and tracks the inventory level of a physical store on behalf of the third-party system.

The metric that measures the size of the dynamic item entries may be defined and determined differently in various embodiments. In some embodiments, the metric may be a direct count of available items for sales in the physical location. In some embodiments, the metric may be a weighted metric that is scored based on the count of available items, but some of the items (e.g., more popular items) may be weighed differently than other items. In some embodiments, the metric may be based on item categories. For example, the count of available items in a particular category may be weighted entirely or more heavily than another category. The preferred category may be defined based on the popularity of the category, the nature of the store (a beverage specialty store may weigh alcoholic drinks more heavily), historical purchase history of the user (categories that are often purchased by the user may be weighed more heavily).

In some embodiments, the metric may also be partially defined based on the preference inputs provided by the user. For example, certain users may prefer specific types of items (Kosher items, organic items, low carb items, etc.) and may specify those preferences in the user profile of the online concierge system 102. The online concierge system 102 may weigh more heavily for those preferred items in determining the metric. In some embodiments, the online concierge system 102 may also expand the selection of the subset of physical locations that are eligible for further selection based on information such as a particular store that is far away carrying more preferred items of the user.

In some embodiments, the metric may be defined based on the purchase history of the user. For example, the online concierge system 102 may keep a record of the user's buy-it-again (BIA) items. If the BIA items are across broad categories and things that the user buys frequently are not at a specific store, the online concierge system 102 may switch the user to another store that satisfies more of the BIA items. Hence, the metric may be determined by the availability of BIA items in a physical location or the BIA items are weighed more heavily than other items.

The various factors (from item raw counts, item categories, weights, preferred items, to user purchase history, etc.) discussed above that may be used to determine the metric may be referred to as features of the physical location or features associated with the user. A metric may be determined based on one or more features discussed above. In some embodiments, the metric may be referred to as an inventory area, which represents the size of the inventory.

The determination of the metric may be performed in different ways in various embodiments. In some embodiments, the metric is a composite metric that is a combination of various possible metrics discussed above. In some embodiments, the metric is defined by a formula for the online concierge system 102 to calculate. In some embodiments, the metric is determined by an algorithm that receives various input factors. In some embodiments, For each physical location in the subset, determining the metric measuring the size of the dynamic item entries available in the time-sensitive dataset includes using a machine learning model to predict the value of the metric. The determination of the metric value or a selection of a physical location using a machine learning model will be further discussed in association with FIG. 9.

In some embodiments, after determining the metrics for the candidate physical locations in the subset, the online concierge system 102 may include additional physical locations that are eligible for selection. For example, in one case, the online concierge system 102 determines that the subset of physical locations have values of the metric below a threshold. In turn, the online concierge system 102 expands the distance radius for selecting physical locations that are eligible for further selection.

The online concierge system 102 selects 750 one of the physical locations in the subset based on the metric. For example, the selected physical location has a value the metric that indicates the selected physical location has the highest number of dynamic item entries among the subset of physical locations. In some embodiments, the selected physical location has the highest value of the metric and the metric is defined based on various features discussed above. In some embodiments, the selection of the physical location occurs before the user makes any selection of items for the physical arrangement.

In some embodiments, the selection of a particular physical location of the third-party system may also be based on certain rules that may further override the initial decision that may be based on the metric. In some embodiments, the selection may need to be in compliance with certain rigid rules such as legal compliance. For example, in some states, there are alcohol compliance rules regarding where alcohol can be ordered from relative to where the user is. If the user has a consistent history of purchasing alcoholic beverages using the online concierge system 102, the online concierge system 102 may select a store that is in compliance with the legal rule.

In some embodiments, the online concierge system 102 may also compare the values of the metrics of various physical locations and select the final physical location based on both the metric values and the distances among the physical locations to the geographical location associated with the user device. In some embodiments, the online concierge system 102 may require a minimum threshold difference between the physical location with the highest metric value and the closest physical location. If a farther store only has a metric value that is slightly higher than the closest physical location, the online concierge system 102 may select the closest physical location.

By way of example, the selection of one of the physical locations in the subset based on the metric may include determining that a first candidate physical location has a first metric value lower than a second metric value of a second candidate physical location. The online concierge system 102 may determine that a difference between the first metric value and the second metric value is within a threshold. The online concierge system 102 may determine that the first candidate physical location is a closer location. In turn, the online concierge system 102 may select the first candidate physical location as the selected physical location.

The online concierge system 102 causes 760 for display, at the graphical user interface, the dynamic item entries in the time-sensitive dataset associated with the selected physical location. The display of the dynamic item entries allows the user device to select the available entries of the third-party system to be included in the physical arrangement. For example, the graphical user interface may be the graphical user interface 600 and allow the user to add one or more grocery items to a transaction for the agent to pick up at a physical store. The graphical user interface may serve as a single location front that represents multiple physical locations of the third-party system.

The online concierge system 102 performs 770 fulfillment in preparation of the physical arrangement. The user may place the order and batching may occur on the side of the online concierge system 102. In some embodiments, the online concierge system 102 may determine item availability of the selected physical location and other nearby locations. Each location available gets an item availability score, which may be equal to the percentage of items available at the store and is determined at the time of batching. The online concierge system 102 may perform batching by sending the order to the most efficient physical location that has the same or higher item availability score.

By way of example, the online concierge system 102 may receive a final list of available entries selected by the user device to be included in the physical arrangement. The online concierge system 102 may determine, based on the final list, that the physical arrangement is fulfillable at another physical location other than the selected physical location. The other physical location may be closer to the geographical location associated with the user device than the originally selected location. The online concierge system 102 may switch the physical arrangement to the other physical location.

Example Machine Learning Algorithm

In various embodiments, a wide variety of machine learning techniques may be used to determine the metric measuring the size of the dynamic item entries available in the time-sensitive dataset and/or to select a physical location of a third-party system. Examples include different forms of supervised learning, unsupervised learning, and semi-supervised learning such as decision trees, support vector machines (SVMs), regression, Bayesian networks, and genetic algorithms. Deep learning techniques such as neural networks, including convolutional neural networks (CNN), recurrent neural networks (RNN) and long short-term memory networks (LSTM), may also be used.

In various embodiments, the training techniques for a machine learning model may be supervised, semi-supervised, or unsupervised. In supervised learning, the machine learning models may be trained with a set of training samples that are labeled. For example, for a machine learning model trained to predict a metric value, the training samples may include one or more historical transaction sessions in which the potential features of the metric discussed above and the final orders selected by the user are recorded. The labels for each training sample may be binary or multi-class. The label may be the determined metric values in the historical transaction sessions. In some cases, an unsupervised learning technique may be used. The samples used in training are not labeled. Various unsupervised learning technique such as clustering may be used. In some cases, the training may be semi-supervised with training set having a mix of labeled samples and unlabeled samples.

A machine learning model may be associated with an objective function, which generates a metric value that describes the objective goal of the training process. For example, the training may intend to reduce the error rate of the model in generating predictions. In such a case, the objective function may monitor the error rate of the machine learning model. In determining a metric value, the objective function of the machine learning algorithm may be the training error rate in predicting the value compared to the actual value. Such an objective function may be called a loss function. Other forms of objective functions may also be used, particularly for unsupervised learning models whose error rates are not easily determined due to the lack of labels. In various embodiments, the error rate may be measured as cross-entropy loss, L1 loss (e.g., the sum of absolute differences between the predicted values and the actual value), L2 loss (e.g., the sum of squared distances).

Figure 9:
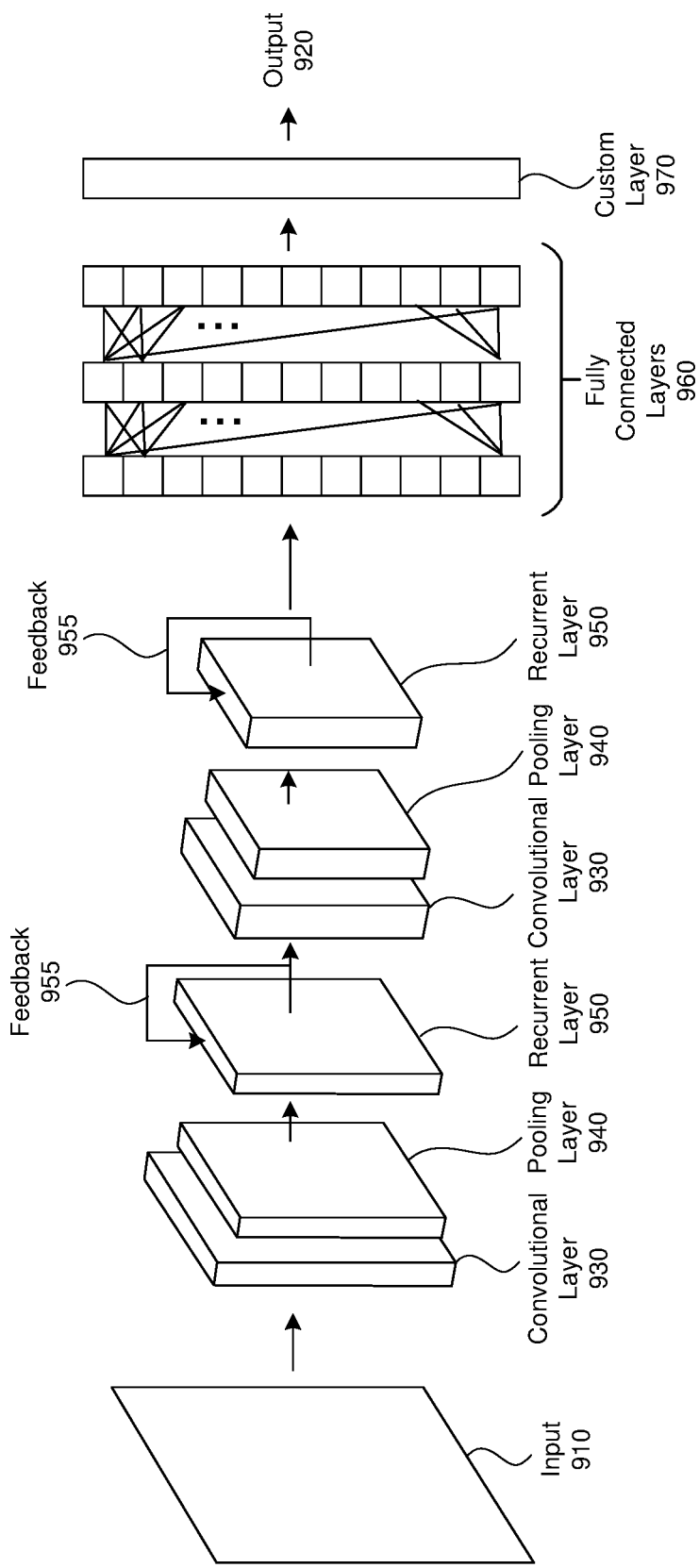
FIG. 9 is a conceptual diagram that illustrates a machine learning model, according to an embodiment.

Referring to FIG. 9, a structure of an example CNN is illustrated, according to an embodiment. The CNN 900 may receive an input 910 and generate an output 920. The CNN 900 may include different kinds of layers, such as convolutional layers 930, pooling layers 940, recurrent layers 950, full connected layers 960, and custom layers 970. A convolutional layer 930 convolves the input of the layer with one or more kernels to generate different types of data that are filtered by the kernels to generate feature maps. Each convolution result may be associated with an activation function. A convolutional layer 930 may be followed by a pooling layer 940 that selects the maximum value (max pooling) or average value (average pooling) from the portion of the input covered by the kernel size. The pooling layer 940 reduces the spatial size of the extracted features. In some embodiments, a pair of convolutional layer 930 and pooling layer 940 may be followed by a recurrent layer 950 that includes one or more feedback loop 955. The feedback 955 may be used to account for spatial relationships of the features in an image or temporal relationships of the objects in the image. The layers 930, 940, and 950 may be followed in multiple fully connected layers 960 that have nodes (represented by squares in FIG. 9) connected to each other. The fully connected layers 960 may be used for classification and object detection. In one or more embodiments, one or more custom layers 970 may also be presented for the generation of a specific format of output 920.

The order of layers and the number of layers of the CNN 900 in FIG. 9 is for example only. In various embodiments, a CNN 900 includes one or more convolutional layer 930 but may or may not include any pooling layer 940 or recurrent layer 950. If a pooling layer 940 is present, not all convolutional layers 930 are always followed by a pooling layer 940. A recurrent layer may also be positioned differently at other locations of the CNN. For each convolutional layer 930, the sizes of kernels (e.g., 3×3, 9×5, 7×7, etc.) and the numbers of kernels allowed to be learned may be different from other convolutional layers 930. While the structure of a neural network is shown, other machine learning models discussed above may also be used.

A machine learning model may include certain layers, nodes, kernels and/or coefficients. Training of a neural network, such as the CNN 900, may include forward propagation and backpropagation. Each layer in a neural network may include one or more nodes, which may be fully or partially connected to other nodes in adjacent layers. In forward propagation, the neural network performs the computation in the forward direction based on outputs of a preceding layer. The operation of a node may be defined by one or more functions. The functions that define the operation of a node may include various computation operations such as convolution of data with one or more kernels, pooling, recurrent loop in RNN, various gates in LSTM, etc. The functions may also include an activation function that adjusts the weight of the output of the node. Nodes in different layers may be associated with different functions.

Each of the functions in the neural network may be associated with different coefficients (e.g. weights and kernel coefficients) that are adjustable during training. In addition, some of the nodes in a neural network may also be associated with an activation function that decides the weight of the output of the node in forward propagation. Common activation functions may include step functions, linear functions, sigmoid functions, hyperbolic tangent functions (tanh), and rectified linear unit functions (ReLU). After an input is provided into the neural network and passes through a neural network in the forward direction, the results may be compared to the training labels or other values in the training set to determine the neural network's performance. The process of prediction may be repeated for other training samples in the training sets to compute the value of the objective function in a particular training iteration. In turn, the neural network performs backpropagation by using gradient descent such as stochastic gradient descent (SGD) to adjust the coefficients in various functions to improve the value of the objective function.

Multiple iterations of forward propagation and backpropagation may be performed. Training may be completed when the objective function has become sufficiently stable (e.g., the machine learning model has converged) or after a predetermined number of rounds for a particular set of training samples. The trained machine learning model can be used for selecting a physical location of a third-party system based on various features such as item raw counts, item categories, weights, preferred items, and user purchase history. For example, the machine learning model may be used to select a physical location that has the highest likelihood that the user will select the highest number of entries to be included in the physical arrangement.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one or more embodiments, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method, comprising:
   accessing a machine learning model trained to predict a metric value representing a size of dynamic item entries available, wherein, the machine learning model was trained by:
      obtaining training datasets of historical transactions at a plurality of geographical locations, the training datasets including weighted values associated with items at the geographical locations;
      forward propagating data from the training datasets through the machine learning model to generate predicted metric values;
      backpropagating the predicted metric values through the machine learning model to adjust weights of the machine learning; and
      saving the adjusted item availability model;
   receiving, by an online system from a user device, a request to view, at a graphical user interface, available entries of a third-party system, the request being in association with a session in which the user device requests information identifying a physical arrangement between an agent of the online system and the third-party system at a physical location of the third-party system, wherein the third-party system operates in connection with a plurality of physical locations, and an operation of each physical location is documented by a time-sensitive dataset which includes a plurality of dynamic item entries that vary in a course of the operation of the physical location;
   retrieving a geographical location associated with the user device;
   determining a subset of physical locations operated by the third-party system that are eligible for further selection based on distances of the physical locations from the geographical location associated with the user device;
   determining, using the trained machine learning model, for each physical location in the subset, a metric measuring a size of the dynamic item entries available in the time-sensitive dataset;
   selecting one of the physical locations in the subset based on the metric; and
   causing the dynamic item entries in the time-sensitive dataset associated with the selected physical location to be displayed at the graphical user interface, wherein the display of the dynamic item entries allows the user device to select the available entries of the third-party system to be included in the physical arrangement.

2. The computer-implemented method of claim 1, wherein determining a subset of physical locations that are eligible for further selection comprises:
   determining a list of candidate agents of the online system;
   determining geographical locations of the list of candidate agents; and
   determining the subset of physical locations further based on predicted distances of the physical arrangement carried out by the candidate agents.

3. The computer-implemented method of claim 1, wherein causing the dynamic item entries in the time-sensitive dataset associated with the selected physical location to be displayed at the graphical user interface comprises causing the graphical user interface to display a single location front that represents plurality of physical locations of the third-party system.

4. The computer-implemented method of claim 1, wherein the selected physical location has an associated metric value that indicates the selected physical location has a highest number of dynamic item entries among the subset of physical locations.

5. The computer-implemented method of claim 1, wherein the selected physical location has an associated metric value that indicates the selected physical location has a highest likelihood that the user device will select a highest number of entries to be included in the physical arrangement.

6. The computer-implemented method of claim 1, further comprising:
   determining that the subset of physical locations have values of the metric below a threshold; and
   expanding distance radius for selecting physical locations that are eligible for further selection.

7. The computer-implemented method of claim 1, further comprising:
   receiving a final list of available entries selected by the user device to be included in the physical arrangement;
   determining, based on the final list, that the physical arrangement is fulfillable at another physical location other than the selected physical location, the other physical location closer to the geographical location associated with the user device; and
switching the physical arrangement to the other physical location.

8. The computer-implemented method of claim 1, wherein the metric measuring the size of the dynamic item entries available is based on item categories.

9. The computer-implemented method of claim 1, wherein selecting one of the physical locations in the subset based on the metric comprises:
   determining that a first candidate physical location has a first metric value lower than a second metric value of a second candidate physical location;
   determining that a difference between the first metric value and the second metric value is within a threshold;
   determining that the first candidate physical location is a closer location; and
   selecting the first candidate physical location as the selected physical location.

10. A computer program product comprising a non-transitory computer readable storage medium having instructions encoded thereon that, when executed by a processor, cause the processor to:
    access a machine learning model trained to predict a metric value representing a size of dynamic item entries available, wherein, the machine learning model was trained by:
       obtaining training datasets of historical transactions at a plurality of geographical locations, the training datasets including weighted values associated with items at the geographical locations;
       forward propagating data from the training datasets through the machine learning model to generate predicted metric values;
       backpropagating the predicted metric values through the machine learning model to adjust weights of the machine learning; and
       saving the adjusted item availability model;
    receive, by an online system from a user device, a request to view, at a graphical user interface, available entries of a third-party system, the request being in association with a session in which the user device requests information identifying a physical arrangement between an agent of the online system and the third-party system at a physical location of the third-party system, wherein the third-party system operates in connection with a plurality of physical locations, and an operation of each physical location is documented by a time-sensitive dataset which includes a plurality of dynamic item entries that vary in a course of the operation of the physical location;
    retrieve a geographical location associated with the user device;
    determine a subset of physical locations operated by the third-party system that are eligible for further selection based on distances of the physical locations from the geographical location associated with the user device;
    determine, using the trained machine learning model, for each physical location in the subset, a metric measuring a size of the dynamic item entries available in the time-sensitive dataset;
    select one of the physical locations in the subset based on the metric; and
    cause the dynamic item entries in the time-sensitive dataset associated with the selected physical location to be displayed at the graphical user interface, wherein the display of the dynamic item entries allows the user device to select the available entries of the third-party system to be included in the physical arrangement.

11. The computer program product of claim 10, wherein the instruction for determining a subset of physical locations that are eligible for further selection comprises instruction for:
    determining a list of candidate agents of the online system;
    determining geographical locations of the list of candidate agents; and
    determining the subset of physical locations further based on predicted distances of the physical arrangement carried out by the candidate agents.

12. The computer program product of claim 10, wherein the selected physical location has an associated metric value that indicates the selected physical location has a highest number of dynamic item entries among the subset of physical locations.

13. The computer program product of claim 10, wherein the selected physical location has an associated metric value that indicates the selected physical location has a highest likelihood that the user device will select a highest number of entries to be included in the physical arrangement.

14. The computer program product of claim 10, wherein the instructions, when executed, further cause the processor to:
    determining that the subset of physical locations have values of the metric below a threshold; and
    expanding distance radius for selecting physical locations that are eligible for further selection.

15. The computer program product of claim 10, wherein the instructions, when executed, further cause the processor to:
    receiving a final list of available entries selected by the user device to be included in the physical arrangement;
    determining, based on the final list, that the physical arrangement is fulfillable at another physical location other than the selected physical location, the other physical location closer to the geographical location associated with the user device; and
    switching the physical arrangement to the other physical location.

16. The computer program product of claim 10, wherein the metric measuring the size of the dynamic item entries available is based on item categories.

17. The computer program product of claim 10, wherein the instruction for selecting one of the physical locations in the subset based on the metric comprises instructions for:
    determining that a first candidate physical location has a first metric value lower than a second metric value of a second candidate physical location;
    determining that a difference between the first metric value and the second metric value is within a threshold;
    determining that the first candidate physical location is a closer location; and
    selecting the first candidate physical location as the selected physical location.

18. An online system comprising:
    a processor; and
    memory configured to store code comprising instructions, the instructions, when executed by the processor, cause the processor to:
       access a machine learning model trained to predict a metric value representing a size of dynamic item entries available, wherein, the machine learning model was trained by:

obtaining training datasets of historical transactions at a plurality of geographical locations, the training datasets including weighted values associated with items at the geographical locations;

forward propagating data from the training datasets through the machine learning model to generate predicted metric values;

backpropagating the predicted metric values through the machine learning model to adjust weights of the machine learning; and saving the adjusted item availability model;

receive, by the online system from a user device, a request to view, at a graphical user interface, available entries of a third-party system, the request being in association with a session in which the user device requests information identifying a physical arrangement between an agent of the online system and the third-party system at a physical location of the third-party system, wherein the third-party system operates in connection with a plurality of physical locations, and an operation of each physical location is documented by a time-sensitive dataset which includes a plurality of dynamic item entries that vary in a course of the operation of the physical location;

retrieve a geographical location associated with the user device;

determine a subset of physical locations operated by the third-party system that are eligible for further selection based on distances of the physical locations from the geographical location associated with the user device;

determine, using the trained machine learning model, for each physical location in the subset, a metric measuring a size of the dynamic item entries available in the time-sensitive dataset;

select one of the physical locations in the subset based on the metric; and cause the dynamic item entries in the time-sensitive dataset associated with the selected physical location to be displayed at the graphical user interface, wherein the display of the dynamic item entries allows the user device to select the available entries of the third-party system to be included in the physical arrangement.

19. The online system of claim 18, wherein the instruction for determining a subset of physical locations that are eligible for further selection comprises instructions for:

determining a list of candidate agents of the online system;

determining geographical locations of the list of candidate agents; and determining the subset of physical locations further based on predicted distances of the physical arrangement carried out by the candidate agents.

20. The online system of claim 18, wherein the instructions, when executed, further cause the processor to:

receive a final list of available entries selected by the user device to be included in the physical arrangement;

determine, based on the final list, that the physical arrangement is fulfillable at another physical location other than the selected physical location, the other physical location closer to the geographical location associated with the user device; and switch the physical arrangement to the other physical location.

* * * * *